United States Patent
Gratz et al.

(10) Patent No.: US 12,071,677 B2
(45) Date of Patent: Aug. 27, 2024

(54) LITHIUM IRON PHOSPHATE (LFP) BATTERY RECYCLING

(71) Applicant: ASCEND ELEMENTS, INC., Westborough, MA (US)

(72) Inventors: Eric Gratz, Worcester, MA (US); Kee-Chan Kim, Worcester, MA (US)

(73) Assignee: Ascend Elements, Inc., Westborough, MA (US)

( * ) Notice: Subject to any disclaimer, the term of this patent is extended or adjusted under 35 U.S.C. 154(b) by 0 days.

(21) Appl. No.: 17/879,059

(22) Filed: Aug. 2, 2022

(65) Prior Publication Data

US 2023/0038978 A1 Feb. 9, 2023

Related U.S. Application Data

(60) Provisional application No. 63/228,331, filed on Aug. 2, 2021.

(51) Int. Cl.
 *C22B 26/12* (2006.01)
 *C22B 1/00* (2006.01)
 *C22B 3/06* (2006.01)

(52) U.S. Cl.
 CPC .............. *C22B 26/12* (2013.01); *C22B 1/005* (2013.01); *C22B 3/06* (2013.01)

(58) Field of Classification Search
 CPC ........... C22B 26/12; C22B 1/005; C22B 3/06; C22B 7/007; Y02P 10/20; Y02W 30/84
 USPC ........................................................ 75/743
 See application file for complete search history.

(56) References Cited

U.S. PATENT DOCUMENTS

| 2018/0261894 A1* | 9/2018 | Wang ..................... C22B 47/00 |
| 2019/0207275 A1 | 7/2019 | Amouzegar et al. |

FOREIGN PATENT DOCUMENTS

| CN | 108155432 A | * | 6/2018 | |
| CN | 112038722 A | | 12/2020 | |
| CN | 112441572 A | * | 3/2021 | ........... C01B 25/375 |
| KR | 1020120031832 A | | 4/2012 | |
| WO | WO-2012072619 A1 | * | 6/2012 | ............. C22B 26/12 |

OTHER PUBLICATIONS

CN-112441572-A Translation (Year: 2021).*
CN-108155432-A Translation (Year: 2018).*
Yang et al, Selective recovery of lithium from spent lithium iron phosphate batteries: a sustainable process, Green Chem., 201, 20, p. 3121-3133 (Year: 2018).*
Forte et al. Lithium iron phosphate batteries recycling: An assessment of current status, Environmental Science and Technology, 2020, p. 1-28 (Year: 2020).*
International Search Report, PCT/US2022/074410, Nov. 17, 2022, pp. 1-3.

* cited by examiner

*Primary Examiner* — Brian D Walck
*Assistant Examiner* — Danielle M. Carda
(74) *Attorney, Agent, or Firm* — Armis IP Law, LLC

(57) ABSTRACT

The inventions described herein provide methods and systems for recycling lithium iron phosphate batteries, including: adding an oxidizing agent to a recycling stream of lithium iron phosphate ($LiFePO_4$) batteries to form a leach solution; filtering the leach solution to remove a residue and obtain a lithium rich solution; modifying pH of the lithium rich solution for filtering impurities and obtaining a purified Li solution; and adding a precipitant to the purified Li solution thereby precipitating a lithium compound.

22 Claims, 1 Drawing Sheet

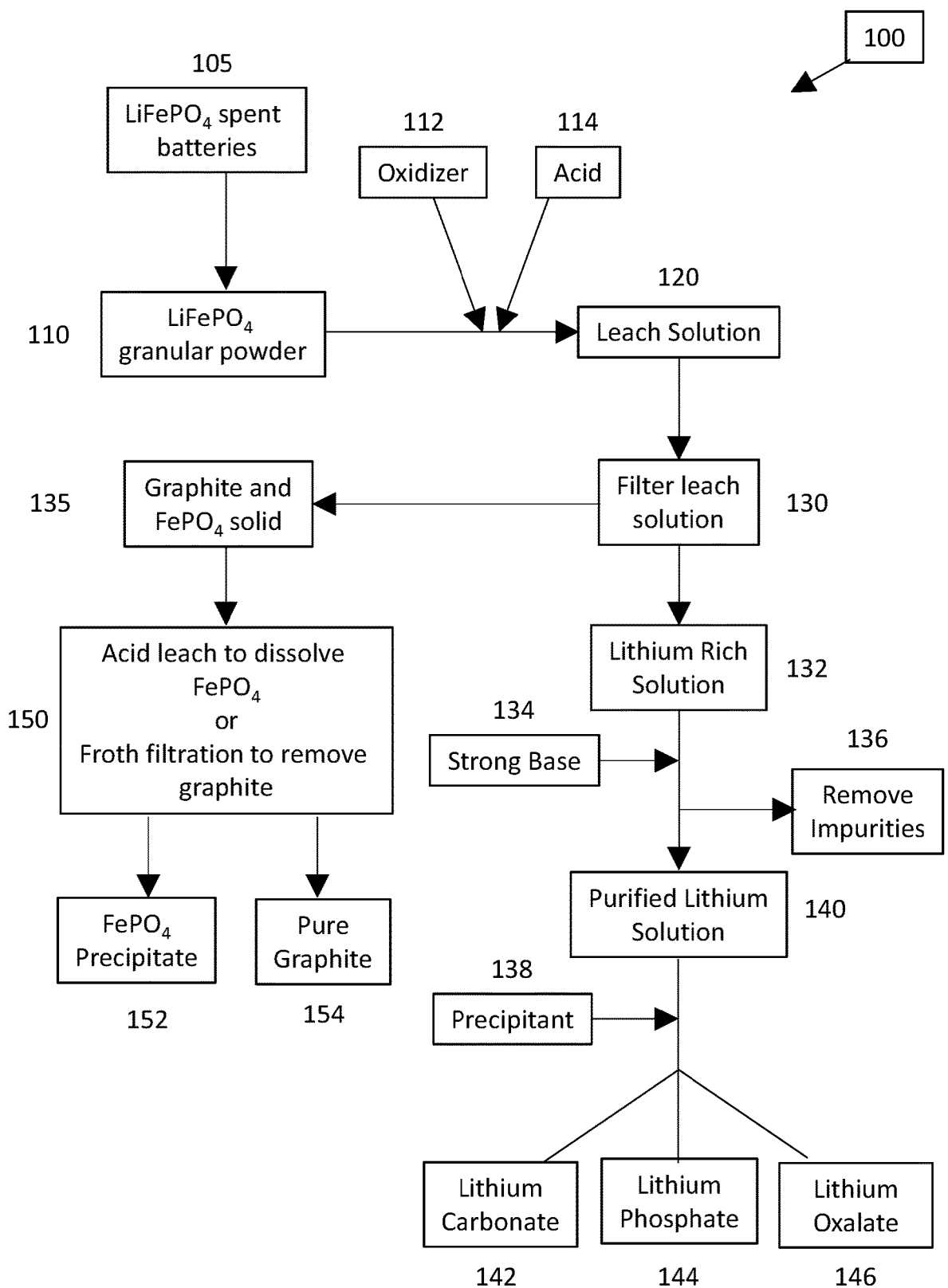

LITHIUM IRON PHOSPHATE (LFP) BATTERY RECYCLING

RELATED APPLICATION

This application claims the benefit under 35 U.S.C. § 119(e) of U.S. provisional application No. 63/228,331 filed Aug. 2, 2021, having the title, "Lithium Iron Phosphate (LFP) battery recycling" by inventors, Eric Gratz and Kee-Chan Kim, which is hereby incorporated by reference herein in its entirety.

BACKGROUND

Recycling of battery materials has garnished substantial attention as an increasing number of electric vehicles (EVs) approach their end of useful lifespan. EVs, and a multitude of appliances and equipment that are more commonly reliant on rechargeable batteries rather than internal combustion engines, contribute to the generation of a recycling stream of exhausted (spent) batteries. The current state of recycling of battery materials is inadequate for the number of spent batteries expected from EVs. Further, materials such as lithium which are critical for EV batteries are in short supply.

Therefore, there is a need for novel methods for recycling and upcycling EV batteries which are cost effective and economically viable for safe disposal, waste management, recovery of critical materials, and sustainable use of resources.

SUMMARY

An aspect of the invention described herein provides a method for recycling lithium iron phosphate batteries, the method including: adding an oxidizing agent to a recycling stream of lithium iron phosphate ($LiFePO_4$) batteries to form a leach solution; filtering the leach solution to remove a residue and obtain a lithium rich solution; modifying pH of the lithium rich solution for filtering impurities and obtaining a purified Li solution; and adding a precipitant to the purified Li solution thereby precipitating a lithium compound.

An embodiment of the method, prior to adding the oxidizing agent further includes shredding the recycling stream of lithium iron phosphate batteries to obtain granular powder of batteries. An embodiment of the method, prior to filtering further includes heating the leach solution. In an embodiment of the method, the leach solution is heated to a temperature in a range between 20° C. to 100° C. In an embodiment of the method, the residue includes at least one of: graphite, and $FePO_4$.

In an embodiment of the method, modifying the pH of the lithium rich solution further includes adding a basic solution. In an embodiment of the method, the lithium rich solution is modified to attain the pH in a range between 5 to 13.

An embodiment of the method further includes achieving a concentration of 0.3-3.0 M of the oxidizing agent to $LiFePO_4$. An embodiment of the method further includes achieving a concentration of 0.5-2.2 M of the oxidizing agent to the $LiFePO_4$.

An embodiment of the method further includes prior to adding an oxidizing agent, adding an acid solution. In an embodiment of the method, the acid solution is selected from an inorganic acid or an organic acid. In an embodiment of the method, the inorganic acid is at least one selected from: sulfuric acid, hydrochloric acid, nitric acid, and phosphoric acid. In an alternative embodiment of the method, the organic acid is at least one selected from: acetic acid, formic acid, propionic acid, butyric acid, oxalic acid, malonic acid, succinic acid, and adipic acid.

In an embodiment of the method, the precipitant is at least one selected from: sodium carbonate, sodium phosphate, phosphoric acid, oxalic acid, and sodium oxalate. In an embodiment of the method, the lithium compound is at least one selected from lithium carbonate ($Li_2CO_3$), lithium phosphate ($Li_3PO_4$), and lithium oxalate ($Li_2C_2O_4$).

An embodiment of the method further includes maintaining pH of the leach solution in a range between 1-6 or 2-6. In an embodiment of the method, the oxidizing agent or the oxidant is at least one selected from: a peroxide ($O_2^{2-}$, a persulfate ($S_2O_8^{2-}$, a sulfate ($SO_4^{2-}$), a hypoclorite ($ClO^-$), a chlorite ($ClO_2^-$), a chlorate ($ClO_3^-$), a perchlorate ($ClO_4^-$), a nitrate ($NO_3^-$), a nitrous oxide ($N_2O$), a nitrogen dioxide ($NO_2$), and a halogen. In an embodiment of the method, the oxidant is at least one selected from: hydrogen peroxide, sodium persulfate, and ammonium persulfate.

An aspect of the invention described herein provides a method for recycling lithium iron phosphate batteries, the method including: adding at least one of: an oxidizing agent, and an acid, to a recycling stream of powdered lithium iron phosphate ($LiFePO_4$) batteries to form a leach solution; maintaining the temperature of the leach solution from 20° C. to 100° C.; filtering the leach solution to remove graphite and $FePO_4$ to obtain a lithium rich solution; modifying pH of the lithium rich solution from 11 to 13 for filtering impurities and obtaining a purified Li solution; and adding a precipitant to the purified Li solution thereby precipitating a lithium compound.

An embodiment of the method further includes after filtering, obtaining purified graphite by at least one process selected from: acid leaching, and froth flotation.

An aspect of the invention described herein provides a method for recycling lithium iron phosphate batteries, the method including: adding an acid to a recycling stream of powdered lithium iron phosphate ($LiFePO_4$) batteries to form a leach solution; maintaining the temperature of the leach solution from 20° C. to 100° C.; filtering the leach solution to remove graphite and $FePO_4$ to obtain a lithium rich solution; modifying pH of the lithium rich solution from 11 to 13 for filtering impurities and obtaining a purified Li solution; and adding a precipitant to the purified Li solution thereby precipitating a lithium compound.

BRIEF DESCRIPTION OF DRAWINGS

FIG. 1 is a schematic drawing of a method for recycling lithium iron phosphate batteries which includes adding an oxidizing agent to the recycling stream of lithium iron phosphate ($LiFePO_4$) batteries to form a leach solution and heating to leach lithium into the solution by oxidizing iron phosphate. The leach solution is then filtered to remove solid $FePO_4$ and graphite and obtain a lithium rich solution. The remaining impurities in the lithium rich solution are precipitated and filtered to obtain a pure lithium solution. The lithium in the solution is precipitated using a precipitant.

DETAILED DESCRIPTION

The aspects of inventions described herein provide recycling processes for end-of-life lithium iron phosphate batteries which focuses on recovery of lithium compounds from cathode materials of these batteries. In contrast to Nickel Manganese Cobalt (NMC) based batteries, Lithium Iron Phosphate (LFP) batteries do not have a reliance on relatively rare nickel and cobalt. While NMC batteries may enjoy a slightly greater charge density, LFP batteries are fabricated from relatively inexpensive materials, of which lithium is the most sought after. The current methods for lithium iron phosphate recycling are not economically favorable. Therefore, a recycling stream directed to Lithium recovery is important and enhancements to recover graphite increase the overall efficiency of the method.

A method for recycling lithium iron phosphate batteries described herein includes adding an oxidizing agent to a granular powder from a recycling stream of lithium iron phosphate ($LiFePO_4$) batteries to form a leach solution and maintaining the leach solution at between 20° C.-100° C. to leach lithium. A number of oxidizing agents may be employed, and these may be complemented by an organic or inorganic acid as discussed further below. Oxidizing agents may include peroxides ($O_2^{2-}$), persulfates ($S_2O_8^{2-}$), sulfates ($SO_4^{2-}$), hypoclorites ($ClO^-$), chlorites ($ClO_2^-$), chlorates ($ClO_3^-$), perchlorates ($ClO_4^-$), nitrates ($NO_3^-$), nitrous oxides ($N_2O$), nitrogen dioxide ($NO_2$), halogens ($Cl_2$, $Br_2$, $I_2$), etc. The oxidizing agents may be combined with an inorganic acid (such as sulfuric, hydrochloric, nitric or phosphoric acid) or an organic acid (including mono-carboxylic or dicarboxylic acids). Other suitable acids and oxidizing agents may be introduced.

FIG. 1 shows a recycling process 100 which commences with the gathering of a recycling stream 110 of spent batteries 105, such as from retired EVs, or retired batteries from EVs, which is processed to be in granular powder form 110. An oxidizing agent 112 and optional acid 114 combine with the granulated materials from the recycling stream in a leach solution 120. The oxidizing agent 112 may achieve a concentration of 0.3-3.0 M of the oxidizing agent to the concentration of $LiFePO_4$ (molar ratio), and preferably will achieve a concentration of 0.5-2.2 M of the oxidizing agent to the concentration of $LiFePO_4$. The optional acid 114 may be an organic or inorganic acid added prior to heating to leach lithium into the solution, such that the acid is generally selected based on removal of iron from the leach solution.

Following leaching reaction in presence or in absence of external heat source, the leach solution is filtered at 130 to separate graphite and $FePO_4$ 135 (such as in the form of a filter cake) from a lithium rich solution 132. The solution contains a substantial amount of the lithium contained in the recycling stream, attempting to strike a balance between leaching useful lithium without allowing excessive iron to dissolve into the leach solution.

A strong base 134 is added to the lithium rich solution to increase the pH to between 5-13 for filtering impurities to form a purified Li solution 140, and preferably to attain a pH in a range between 11-13. Remaining impurities precipitate and are filtered out at 136, and a further precipitant 138 is added to the purified Li solution to precipitate a charge material including a lithium compound, suitable for use in a recycled battery.

The recovered lithium compound is directed based on the precipitant added to the pure Li solution. For example, lithium is recovered as lithium carbonate ($Li_2CO_3$) 142 by adding sodium carbonate to the purified Li solution. Further, lithium may be recovered as lithium phosphate ($Li_3PO_4$) 144 by adding sodium phosphate or phosphoric acid to the purified Li solution. Another alternative is to recover Li as lithium oxalate 146 ($Li_2C_2O_4$) by adding oxalic acid or sodium oxalate to the purified Li solution. Other suitable charge material compounds may be precipitated based on the added materials to combine with the solution 140.

Graphite may be recovered from the graphite and $FePO_4$ filter cake 135 by removing the $FePO_4$ 138 by dissolving $FePO_4$ in strong acid and washing or by froth flotation to selectively separate graphite 152 from $FePO_4$ precipitate 154 as shown at 150

Lithium recovery in industrial processes including battery recycling is accomplished by precipitation from solutions. Therefore, in order to have high efficiency and high purity it is desirable to have a high concentration of lithium relative to other elements. In methods described herein lithium is selectively leached from lithium iron phosphate batteries, the resulting processes are capable of recovering lithium at high efficiencies with high purity technical or battery grade lithium products.

In more detail, in embodiments described herein, lithium ion is leached by an oxidizing agent with or without an acid from a mixture of cathode and anode powder of spent $LiFePO_4$ batteries. The oxidizing agent is added at a concentration of 0.3-3 molar ratio to $LiFePO_4$. The preferable concentration is 0.5-2.2 molar ratios. The acid is selected from an inorganic acid such as sulfuric acid, hydrochloric acid, nitric acid or phosphoric acid, or from an organic acid. The organic acid is preferably a mono-carboxylic acid having the formula RCOOH; R: H, or alkyl ($C_nH_{2n+1}$; n: 1-6) or a dicarboxylic acid having the formula $HO_2C$—$(CH_2)_n$—$CO_2H$; n: 0-8. Examples of monocarboxylic acid are acetic acid, formic acid, propionic acid, or butyric acid. Examples of dicarboxylic acid are oxalic acid, malonic acid, succinic acid, or adipic acid.

The acid concentration in the leaching solution is from 0 M to 5 M. In embodiments using inorganic acid, the preferred concentration is 0.5-1 molar ratio of acid to lithium ion. In embodiments using organic acid, the preferred concentration is 3-5 molar ratio of acid to lithium ion. In some embodiments, a base such as NaOH may be added to adjust the pH of the leaching solution pH at 2-6. The ratio for amount of solid $LiFeSO_4$ to the amount of acid solution is 100 g-1000 g per liter; preferably 200 g-500 g per liter. The leaching temperature is maintained from 20° C. to 100° C. depending on the selected oxidant, or the acid.

After completing the leaching process, the processed mixture is filtered, and the residue is washed with deionized water. The residue is black solid containing graphite and $FePO_4$. The impurities in the filtrate are removed by adjusting the pH from 5 to 13, preferably from 11 to 13. The pH is adjusted by adding a strong base such as sodium hydroxide solution or potassium hydroxide solution at a concentration of 0-5 M. The precipitates from impurities are removed by filtration to obtain a lithium-ion enriched filtrate.

The lithium-ion enriched filtrate can be concentrated by evaporating the water from the filtrate. The lithium is recovered as lithium carbonate ($Li_2CO_3$) by adding sodium carbonate as lithium phosphate ($Li_3PO_4$) by adding sodium phosphate or phosphoric acid, or as lithium oxalate ($Li_2C_2O_4$) by adding oxalic acid or sodium oxalate to the concentrated solution. Lithium hydroxide or carbonate can be obtained from lithium oxalate by heating, for example by thermal conversion at 350° C. to 500° C.

In particular configurations, graphite may also be recovered. The graphite is recycled from the black solid by leaching the $FePO_4$ or by froth floatation. For leaching, the black solid is added to a diluted (2-9 M) or concentrated inorganic acid, such as sulfuric acid, hydrochloric acid or nitric acid, preferably 4-6 M acid solutions. The mixture is heated and stirred at 25° C.-80° C. Purified graphite is collected by filtration and rinsed with 1-5 M inorganic acid. The purified graphite is then washed with deionized water until the filtrate becomes neutral pH. In froth floatation process, the graphite is floated, and the iron phosphate precipitates or sediments.

Multiple methods for selective leaching of lithium ions from spent LFP powder are described herein. The methods include acid only leaching, oxidant only leaching, acid and oxidant leaching with various acids such as inorganic and organic acids.

Strong inorganic acid dissolves LFP and lithium ions leach with iron and phosphate ions. The coprecipitation of lithium ions with iron hydroxide precipitate results in reduced efficiency of lithium recovery and requires removal of iron impurities. In dilute acid solutions, lithium ions do not leach from LFP solid without assistance of an oxidant. However, lithium ions in LFP are selectively leached in a dilute acid solution ($[H_2SO_4]/[LFP]$: ~0.6) with hydrogen peroxide as an oxidant. In dilute acid solution system, hydrogen peroxide oxidizes ferrous ions in LFP and liberates Li ions from LFP. Further acid helps dissolve the liberated lithium ions from LFP into the solution thereby balancing the charges. Sulfuric acid is a favorable choice among the inorganic acids. However, high concentrations of sulfate ions interfere the recovery of $Li_2CO_3$ because sodium sulfate in the lithium recovery solutions is often coprecipitated due to the moderate solubility of $Na_2SO_4$. Therefore, dilute sulfuric acid solutions are preferable for selective Li leaching and $Li_2CO_3$ recovery.

Sodium persulfate ($Na_2S_2O_8$) is a strong oxidant and is able to quantitatively and completely leach out the lithium in LFP by oxidative liberation of Li ions from $LiFePO_4$ in aqueous solution without any acid. However, because the byproduct of the reaction is sulfate ions, $Li_2CO_3$ recovery is observed to be reduced. In some embodiments, ammonium persulfate $(NH_4)_2S_2O_8$ is used to reduce the interference.

Environmentally friendly organic acid is an alternative acid for selective lithium ion leaching from LFP instead of strong inorganic acids. Because organic acids such as formic acid and acetic acid are weak acids in aqueous solutions and have carboxylic functional group for metal ion chelating, these acids were observed to selectivity leach lithium ion from the LFP via oxidative liberation of lithium ion from $LiFe(II)PO_4$ to $Fe(III)PO_4$. Hydrogen peroxide was observed to be a good oxidant for these reactions. Acetate is a stronger chelating agent than formate. Therefore, the required molar ratio of acetate to LFP was lesser compared to the required molar ratio of formate to LFP, thereby resulting in lower costs.

The inventions described herein are the most practical methods. It is recognized, however, that departures may be made within the scope of the invention and that modifications will occur to a person skilled in the art. With respect to the above description then, it is to be realized that the optimum dimensional relationships for the parts of the invention, to include variations in size, materials, shape, form, function, steps, and manner of operation, assembly and use, would be apparent to one skilled in the art, and all equivalent relationships to those illustrated in the drawings and described in the specification are intended to be encompassed by the present inventions.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Such equivalents are within the scope of the present invention and claims. The contents of all references including issued patents and published patent applications cited in this application are hereby incorporated by reference.

The invention now having been fully described is further exemplified by the following examples and claims.

Example 1: Sulfuric Acid with Hydrogen Peroxide

Selective lithium ion leaching from LFP was examined in various concentration of sulfuric acid solution with or without hydrogen peroxide (molar ratio of sulfuric acid to LFP $[H_2SO_4]/[LFP]$ from 0.6 to 4.9; molar ration of $H_2O_2$ to LFP $[H_2O_2]/[LFP]$: 2.2 or 0; LFP (g):Water (mL): 1:5; temperature: not controlled from ambient temp, 30-50 C; reaction/stirring time: 3-4 hours after completion of adding hydrogen peroxide).

Selective leaching of lithium ion was achieved in a diluted sulfuric acid solution ($[H_2SO_4]/[LFP]$: 0.6-0.7) with hydrogen peroxide as an oxidant ($[H_2O_2]/[LFP]$: 2.2). The selective leaching efficiency was 100% with less than 0.1% of iron leaching. If the recycling stream includes contamination with nickel, cobalt, and manganese, the recovery of lithium ion (after removal of impurity ions by precipitation at pH: 11-12) as lithium carbonate was affected because sodium sulfate coprecipitated with $Li_2CO_3$ in the lithium concentrated solution. If the recycling stream contains pure LFP material, the impurity removal was performed at pH: 7-8, and $Li_2CO_3$ recovery was observed to have improved (56% vs. 30%). The improvement of Li ions is because of reduced loss of Li ion by impurity removal; low impurity concentration, and lower pH adjustment thereby introducing less sodium ions. Hydrogen peroxide is necessary to selectively leach lithium ion in dilute sulfuric acid solution.

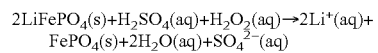

$$2LiFePO_4(s)+H_2SO_4(aq)+H_2O_2(aq) \rightarrow 2Li^+(aq)+FePO_4(s)+2H_2O(aq)+SO_4^{2-}(aq)$$

However, upon increasing the concentration of sulfuric acid, LFP begins dissolving in the acidic solution. The higher the acid concentration, more dissolution of LFP is observed. Therefore, iron and phosphate ion concentrations in the solution increase with the increase of Li ion concentration and the selectivity for Li is eliminated in $[H_2SO_4]/[LFP]$: 2.4 molar ratio or higher with 100% Li and 80-100% Fe leaching without the presence of $H_2O_2$. The presence of iron and phosphate ions impacts lithium recovery as lithium carbonate. Some lithium ions are precipitated as $Li_3PO_4$ with ready-existing phosphate ions upon raising the solution pH to remove ferric ions as $Fe(OH)_3$ causing the loss of Li for $Li_2CO_3$ recovery.

The impurities (Cu, Al, Fe, Ni, Co, Mn, etc.) in the Li rich solution were removed by precipitating the impurities as metal hydroxides at pH: 7-12. The solution pH was adjusted depending on the nature of impurities present in the solution. If the impurities include Cu, Al and Fe, then pH was adjusted to 7-8. If the impurities contained Ni, Co and Mn, the pH was adjusted to 11-13.

The excess sodium ions in the solution are reduced by increasing the concentration of $Li_2SO_4$ in the lithium rich solution by reducing the volume of the solution such that all $Li_2SO_4$ is dissolved in the solution (about 1.5 times of volume for the solubility from the ICP analysis result). The $Na_2SO_4$ is then crystalized at low temperatures (0-5° C.) using the large solubility difference between $Na_2SO_4$ and $Li_2SO_4$.

Lithium ions in the leaching solution are precipitated by adding sodium carbonate (1.25 times of the stoichiometric amount). The sodium carbonate is added as a solid or as a saturated solution to high concentration Li solution. It was observed that adding sodium carbonate as saturated solution resulted in better yield and purity of lithium. The results of multiple tests using different recycling streams, and including the purity and yield of lithium are tabulated in Table 1.

TABLE 1

Results of Sulfuric Acid with Hydrogen Peroxide

| | LFP Source | $[H_2SO_4]/$ [LFP] | $[H_2O_2]/$ [LFP] | Leaching Efficiency of Li (%) | Fe Leaching (%) | $Li_2CO_3$ Yield (%) | $Li_2CO_3$ Purity (%) |
|---|---|---|---|---|---|---|---|
| 1 | P | 0.6 | 2.2 | 94 | 0.7 | 26 | >99 |
| 2 | P | 1.2 | 2.2 | 100 | 100 | 56 | N/A |
| 3 | P | 2.4 | 2.2 | N/A | N/A | N/A | N/A |
| 4 | P | 4.8 | 2.2 | 100 | 82 | 78 | 8 |
| 5 | P | 0.6 | 0.0 | 59 | 19 | N/A | N/A |
| 6 | P | 1.2 | 0.0 | 78 | 45 | N/A | 91 |
| 7 | P | 2.4 | 0.0 | 100 | 89 | N/A | N/A |
| 8 | P | 4.8 | 0.0 | N/A | N/A | N/A | N/A |
| 9 | P | 0.7 | 3.0 | 100 | 1.2 | 24 | 98 |
| 10 | P | 0.7 | 4.8 | 100 | 1.3 | N/A | N/A |
| 11 | P | 0.6 | 2.2 | 100 | <0.1 | 30 | 87 |
| 12 | C | 0.6 | 2.3 | N/A | N/A | 44 | >99 |
| 13 | C | 0.6 | 2.3 | 100 | <0.1 | 57 | >99 |

P: Plant shredded cathode & anode mixture from spent LFP batteries (some NMC contamination); C: Commercial LFP cathode product. Major impurity in recovered $Li_2CO_3$ product is sodium sulfate.

Example 2: Using Sodium Persulfate ($Na_2S_2O_8$) as Oxidant

Selective leaching of lithium ions from LFP was achieved by oxidation of $Fe^{2+}$ in the LFP to $Fe^{3+}$ in aqueous solutions.

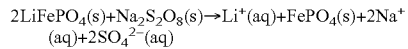
$2LiFePO_4(s)+Na_2S_2O_8(s) \rightarrow Li^+(aq)+FePO_4(s)+2Na^+$
$(aq)+2SO_4^{2-}(aq)$ Sodium persulfate was used as the oxidant for $Fe^{2+}$ in the LFP in an aqueous solution. In this example, acid was not required, and water was used as the solvent. Sodium persulfate was slowly added to the LFP disperse solution mixture. The conditions for the reaction were: LFP (g) to water (mL) ratio: 1:2; molar ratio of $Na_2S_2O_8$ to LFP, $[Na_2S_2O_8]/[LFP]$: 1.00-1.37; temperature: ambient; stirring time: 1-4 hours.

The molar ratio of $[Na_2S_2O_8]/[LFP]$ was calculated and observed to be about 1.37 to achieve 100% Li leaching. The Li leaching percentage dropped to 75% if plant shredded spent LFP battery material was used which is a mixture of cathode and anode with some contamination of Ni, Mn and Co from NMC spent batteries. If sodium persulfate is contacted with water, it is converted to acid and hydrogen peroxide as shown in the following equation. Therefore, the solution acidity increases and Fe is leached from LFP.

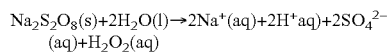
$Na_2S_2O_8(s)+2H_2O(l) \rightarrow 2Na^+(aq)+2H^+aq)+2SO_4^{2-}$
$(aq)+H_2O_2(aq)$ The sodium sulfate from sodium persulfate hinders the ability to recover the leached Li from the solution as $Li_2CO_3$. Therefore, the recovery yield of $Li_2CO_3$ was low (<50%) with purity below 99%, even though the leaching efficiency is 100%. The results of multiple tests including the purity and yield of lithium are tabulated in Table 2.

TABLE 2

Results of sodium persulfate ($Na_2S_2O_8$) as oxidant

| | LFP Source | $[Na_2S_2O_8]/$ [LFP] | Leaching Efficiency of Li (%) | Fe Leaching (%) | $Li_2CO_3$ Yield (%) | $Li_2CO_3$ Purity (%) |
|---|---|---|---|---|---|---|
| 1 | P | 1.37 | 100 | 1.75 | 32 | 98 |
| 2 | P | 1.05 | 75 | 0.75 | 16 | 95 |
| 3* | P | 1.0 | 71 | <0.05 | N/A | N/A |

*While adding $Na_2S_2O_8$, the solution pH was maintained at >3.5 by adding dilute NaOH solution as necessary.

Example 3: Formic Acid with Hydrogen Peroxide

Formic acid (HCOOH) was used as an alternative acid for selective Li leaching from LFP because of the suitable $pK_a$ (3.75), which makes leaching solution less acidic thereby reducing the chance of Fe leaching. The conditions for the reactions were as follows: LFP (g) to Water (mL) ratio: 1:2 (4 for commercial samples); molar ratio of formic acid to LFP, [HCOOH]/[LFP]: 3-6; "[NaOH]/[HCOOH]: 0-0.5 (molar ratio); $[H_2O_2]/[LFP]$: 2.2-3.4 (molar ratio); Stirring time: 2-12 hours. Temperature: 30-50° C.

Lithium ions were selectively leached from the LFP materials in the weak organic acid solution. The initial pH of the LFP dispersed formic acid solution is above 1 or higher depending on the amount of formic acid used. After the addition of hydrogen peroxide, the leached solution pH increases about 1 unit or more. Because the leaching solution is less acidic compared to strong inorganic acids (e.g, $H_2SO_4$, HCl or $HNO_3$), $LiFeSO_4$ or $FeSO_4$ dissolution was significantly suppressed. For complete Li leaching from LFP, 4.5-6 molar ratio of formic acid to LFP was used with 2.2 molar ratio of hydrogen peroxide. 1:4 of LFP (g) to $H_2O$ (mL) ratio was sufficient to complete the leaching. The ratio can be further optimized.

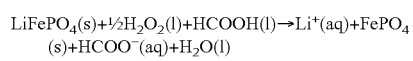
$LiFePO_4(s)+\frac{1}{2}H_2O_2(l)+HCOOH(l) \rightarrow Li^+(aq)+FePO_4$
$(s)+HCOO^-(aq)+H_2O(l)$

TABLE 3

Results using Formic acid and $H_2O_2$

| | LFP Source | [HCOOH]/ [LFP] | [$H_2O_2$]/ [LFP] | Leaching Efficiency of Li (%) | Fe Leaching (%) | $Li_2CO_3$ Yield (%) | $Li_2CO_3$ Purity (%) |
|---|---|---|---|---|---|---|---|
| 1 | P | 3.0 | 2.2 | 86 | 0.5 | 9 | N/A |
| 2 | P | 5.5 | 3.4 | 95 | 1.2 | 72 | >99 |
| 3* | P | 6.0 | 2.4 | 76 | 0.2 | 86 | 45 |
| 4** | C | 6.1 | 2.5 | 73 | 0.2 | 37 | 96 |
| 5 | C | 4.6 | 2.5 | N/A | N/A | 73 | 90 |

*1/3 moles of NaOH to HCOOH was added to the solution before adding LFP in order to make a kind of [HCOOH]/[HCOONa] buffer solution to control the pH.
**Deviation by possible experimental error Hydrogen peroxide oxidizes ferrous ions in LFP to ferric ions. The Li ions in LFP are liberated from the LFP solid, and byproduct $FePO_4$ remains as a solid in the leaching process. Formic acid in the aqueous solution is favorable for the oxidative reaction by hydrogen peroxide and provides pH buffering effect during the leaching process. The results of multiple tests including the purity and yield of lithium are tabulated in Table 3.

Example 4: Acetic Acid with Hydrogen Peroxide

Acetic acid (AcOH) is a weak organic acid ($pK_a$:4.76) with carboxylic functional group, which is a good chelating ligand for metal ions. Acetic acid is a weaker acid compared to formic acid which is evident from its $pK_a$ value. Therefore, acetic acid/acetate buffer solution was able to suppress the iron leaching during the selective and oxidative lithium ion leaching from LFP. The conditions for the reactions are as follows: LFP (g) to Water (mL) ratio: 1:2 (4 for commercial samples); molar ratio of AcOH to LFP, [AcOH]/[LFP]: 1-3; [NaOH]/[AcOH]: 0-0.5 (molar ratio); [$H_2O_2$]/[LFP]: 2.2-2.5 (molar ratio); Stirring time: 3 hours—overnight. Temperature: 30-50° C. Acetic acid/sodium acetate buffer solutions were prepared for the leaching experiments by adding 1/3 molar ratio of sodium hydroxide to acetic acid.

Complete lithium leaching was observed even for one-to-one molar ratio of AcOH to LFP. Because acetate is a good chelating ligand to metal ions, equivalent amount of AcOH to LFP was sufficient to achieve the leaching. Furthermore, iron leaching in AcOH/AcONa buffer (initial pH >4) was completely suppressed. 1:4 of LFP (g) to $H_2O$ (mL) ratio was sufficient to complete the leaching.

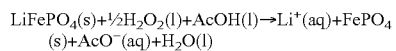

$LiFePO_4(s)+\frac{1}{2}H_2O_2(l)+AcOH(l) \rightarrow Li^+(aq)+FePO_4(s)+AcO^-(aq)+H_2O(l)$ The initial pH of the acetic acid/acetate buffer solution was about 4. The initial pH completely prevented the dissolution of iron phosphate and achieved selective leaching of lithium ion from LFP. Hydrogen peroxide was used as an oxidant, which turns to hydroxide ion at the end of the oxidative leaching process and contributes to increasing the pH of the leaching solution. Acetic acid is a good ligand and required one-to-one molar ratio for completing the leaching process. Acetic acid is less expensive than formic acid thereby has a cost benefit.

The results of multiple tests including the purity and yield of lithium are tabulated in Table 4.

TABLE 4

Results using Acetic Acid with Hydrogen Peroxide

| | LFP Source | [AcOH]/ [LFP] | [H2O2]/ [LFP] | Leaching Efficiency of Li (%) | Fe Leaching (%) | $Li_2CO_3$ Yield (%) | $Li_2CO_3$ Purity (%) |
|---|---|---|---|---|---|---|---|
| 1 | P | 3.0 | 2.2 | >99 | <0.01 | 43 | 97 |
| 2* | P | 2.0 | 2.4 | 70 | <0.01 | 64 | 63 |
| 3 | C | 2.04 | 2.5 | >99 | <0.01 | 68 | 89 |
| 4 | C | 1.10 | 2.5 | >99 | <0.01 | 68 | 92 |

*The deviation could be due to possible experimental error.

What is claimed is:

1. A method for recycling lithium iron phosphate batteries, the method comprising:
    shredding a recycling stream of lithium iron phosphate batteries to obtain granular powder comprising cathodes and anodes of batteries including lithium iron phosphate;
    adding an oxidizing agent to the granular powder from the recycling stream of lithium iron phosphate ($LiFePO_4$) batteries to form a leach solution;
    filtering the leach solution to remove a residue including $FePO_4$ and graphite and obtain a lithium rich solution;
    modifying pH of the lithium rich solution for filtering impurities and obtaining a purified Li solution;
    adding a precipitant to the purified Li solution thereby precipitating a lithium compound; and
    after filtering, purifying the graphite by at least one process selected from acid leaching and froth flotation.

2. The method according to claim 1, wherein prior to filtering further comprising heating the leach solution to a temperature in a range between 20° C. to 100° C.

3. The method according to claim 1, wherein the residue comprises at least one of: graphite and $FePO_4$.

4. The method according to claim 1, wherein modifying the pH of the lithium rich solution further comprises adding a basic solution.

5. The method according to claim 4, wherein the lithium rich solution is modified to attain the pH in a range between 5 to 13.

6. The method according to claim 1 further comprising achieving a concentration of 0.3-3.0 M of the oxidizing agent to a concentration of the $LiFePO_4$.

7. The method according to claim 1 further comprising achieving a concentration of 0.5-2.2M of the oxidizing agent to a concentration of the $LiFePO_4$.

8. The method according to claim 1, wherein adding an oxidizing agent further comprises adding an acid solution.

9. The method according to claim 8, wherein the acid solution is selected from an inorganic acid or an organic acid.

10. The method according to claim 9, wherein the inorganic acid is at least one selected from: sulfuric acid, hydrochloric acid, nitric acid, and phosphoric acid.

11. The method according to claim 9, wherein the organic acid is at least one selected from: acetic acid, formic acid, propionic acid, butyric acid, oxalic acid, malonic acid, succinic acid, and adipic acid.

12. The method according to claim 1, wherein the precipitant is at least one selected from: sodium carbonate, sodium phosphate, phosphoric acid, oxalic acid, and sodium oxalate.

13. The method according to claim 1, wherein the lithium compound is at least one selected from lithium carbonate ($Li_2CO_3$), lithium phosphate ($Li_3PO_4$), and lithium oxalate ($Li_2C_2O_4$).

14. The method according to claim 1 further comprising maintaining pH of the leach solution in a range between 1-6.

15. The method according to claim 1, wherein the oxidizing agent is at least one selected from: a peroxide ($O_2^{2-}$), a persulfate ($S_2O_8^{2-}$), a sulfate ($SO_4^{2-}$), a hypoclorite ($ClO^-$), a chlorite ($ClO_2^-$), a chlorate ($ClO_3^-$), a perchlorate ($ClO_4^-$), a nitrate ($NO_3^-$), a nitrous oxide ($N_2O$), a nitrogen dioxide ($NO_2$), and a halogen.

16. The method according to claim 1, wherein the oxidizing agent is at least one selected from: hydrogen peroxide, sodium persulfate, and ammonium persulfate.

17. The method of claim 1 wherein the lithium products are lithium phosphate or lithium oxalate.

18. The method of claim 1 wherein the impurities are other than Ni, Mn and Co.

19. The method of claim 1 wherein the recycling stream includes cathode materials and anode materials, the lithium iron phosphate included in the cathode materials.

20. The method of claim 1 further comprising modifying pH of the lithium rich solution by raising the pH to 11-13 for filtering impurities.

21. A method for recycling lithium iron phosphate batteries, the method comprising:
    shredding the lithium iron phosphate batteries to obtain a recycling stream of a granular powder comprising cathodes and anodes and including lithium iron phosphate;
    adding at least one of: an oxidizing agent, and an acid, to the granular powder of lithium iron phosphate ($LiFePO_4$) batteries to form a leach solution;
    maintaining the temperature of the leach solution from 20° C. to 100° C.;
    filtering the leach solution to remove graphite and $FePO_4$ to obtain a lithium rich solution;
    modifying pH of the lithium rich solution from 11 to 13 for filtering impurities and obtaining a purified Li solution;
    adding a precipitant to the purified Li solution thereby precipitating a lithium compound; and
    after filtering, purifying the graphite by at least one process selected from acid leaching and froth flotation.

22. A method for recycling lithium iron phosphate batteries, the method comprising:
    shredding a recycling stream of lithium iron phosphate batteries to obtain granular powder comprising cathodes and anodes of the batteries including lithium iron phosphate;
    adding an acid to the recycling stream of powdered lithium iron phosphate ($LiFePO_4$) batteries to form a leach solution;
    maintaining the temperature of the leach solution from 20° C. to 100° C.;
    filtering the leach solution to remove graphite and $FePO_4$ to obtain a lithium rich solution;
    modifying pH of the lithium rich solution from 11 to 13 for filtering impurities and obtaining a purified Li solution;
    adding a precipitant to the purified Li solution thereby precipitating a lithium compound; and
    after filtering, purifying the graphite by at least one process selected from acid leaching and froth flotation.

* * * * *